(12) United States Patent
Miyamoto et al.

(10) Patent No.: US 12,307,926 B2
(45) Date of Patent: May 20, 2025

(54) ELECTRONIC SHELF LABEL SYSTEM

(71) Applicant: MITSUMI ELECTRIC CO., LTD., Tokyo (JP)

(72) Inventors: Hirokatsu Miyamoto, Tokyo (JP); Tomoyuki Okada, Tokyo (JP); Yuya Yoshida, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 72 days.

(21) Appl. No.: 18/254,587

(22) PCT Filed: Nov. 26, 2021

(86) PCT No.: PCT/JP2021/043337
§ 371 (c)(1),
(2) Date: May 25, 2023

(87) PCT Pub. No.: WO2022/114108
PCT Pub. Date: Jun. 2, 2022

(65) Prior Publication Data
US 2024/0046822 A1 Feb. 8, 2024

(30) Foreign Application Priority Data
Nov. 27, 2020 (JP) .................................. 2020-196771

(51) Int. Cl.
*G09F 3/20* (2006.01)
*G06Q 30/0251* (2023.01)
(Continued)

(52) U.S. Cl.
CPC ......... *G09F 3/208* (2013.01); *G06Q 30/0267* (2013.01); *G06Q 30/0268* (2013.01);
(Continued)

(58) Field of Classification Search
None
See application file for complete search history.

(56) References Cited

U.S. PATENT DOCUMENTS

2008/0159191 A1 7/2008 Wang et al.
2010/0245085 A1* 9/2010 Mochizuki ........... G06Q 10/087
340/540

(Continued)

FOREIGN PATENT DOCUMENTS

JP 2010231615 A 10/2010
JP 2012161478 A 8/2012

(Continued)

OTHER PUBLICATIONS

ISA Japan Patent Office, International Search Report Issued in Application No. PCT/JP2021/043337, Jan. 11, 2022, WIPO, 4 pages.

*Primary Examiner* — Nicholas J Lee
(74) *Attorney, Agent, or Firm* — McCoy Russell LLP (57) ABSTRACT

An electronic shelf label system 1 includes a cluster-type network CN constructed from a plurality of electronic shelf label devices and an application device communicatively connected to the cluster-type network CN. The cluster-type network CN includes a shelf label hierarchy constructed from a plurality of electronic shelf label devices which function as shelf labels for a plurality of products and a relay hierarchy constructed from a plurality of electronic shelf label devices each of which relays a signal transmitted from the application device to one of the plurality of electronic shelf label devices 4 of the shelf label hierarchy.

8 Claims, 5 Drawing Sheets

(51) Int. Cl.
*G06Q 30/0601* (2023.01)
*H04W 4/80* (2018.01)
*H04W 76/14* (2018.01)
*H04L 67/12* (2022.01)
*H04W 84/18* (2009.01)

(52) U.S. Cl.
CPC .......... *G06Q 30/0601* (2013.01); *H04W 4/80* (2018.02); *H04W 76/14* (2018.02); *H04L 67/12* (2013.01); *H04W 84/18* (2013.01)

(56) References Cited

U.S. PATENT DOCUMENTS

2016/0055562 A1\* 2/2016 Kim .................. H04W 4/80
  705/26.61
2020/0082454 A1\* 3/2020 De Haas ................ G06Q 20/20

FOREIGN PATENT DOCUMENTS

| WO | 2010021051 | A1 | 2/2010 |
| WO | 2020049371 | A1 | 3/2020 |

\* cited by examiner

Fig. 1

Example of in-store layout of shelving units

ELECTRONIC SHELF LABEL SYSTEM

CROSS REFERENCE TO RELATED APPLICATIONS

The present application is a U.S. National Phase of International Application No. PCT/JP2021/043337 entitled "ELECTRONIC SHELF LABEL SYSTEM," and filed on Nov. 26, 2021. International Application No. PCT/JP2021/043337 claims priority to Japanese Patent Application No. 2020-196771 filed on Nov. 27, 2020. The entire contents of each of the above-listed applications are hereby incorporated by reference for all purposes.

TECHNICAL FIELD

The present invention generally relates to electronic shelf label systems including a plurality of electronic shelf label devices attached to a shelving unit for placing products thereon and an application device communicatively connected to the plurality of electronic shelf label devices, in particular to an electronic shelf label system including a cluster-type network constructed from the plurality of electronic shelf label devices and an application device communicatively connected to the cluster-type network.

BACKGROUND ART

An electronic shelf label device is typically utilized in a retail store such as a supermarket in order to reduce an effort to replace a shelf label for changing a product name and a product price. The electronic shelf label device includes a display for displaying product information such as the product name and the product price. For example, patent document 1 discloses an electronic shelf label system for wirelessly controlling a plurality of electronic shelf label devices attached to the shelving unit for placing products thereon according to their categories.

The plurality of electronic shelf label devices each of which includes a display are respectively related to the products placed according to their categories on the shelving unit. The plurality of electronic shelf label devices are respectively attached to the shelving unit so as to be located adjacent to the related product in the electronic shelf label system of the patent document 1. Each of the plurality of electronic shelf label devices attached to the shelving unit can receive information on the product (such as the product price and the product name) related to itself from a server via a dedicated gateway and a wireless communication repeater (such as a router and a transceiver) to display the information on the product related to itself on the display. Thus, by utilizing the above-described electronic shelf label system, it is possible to reduce the effort to replace a shelf label for changing the product name and the product price.

However, signal transmitting from the server to each of the electronic shelf label devices is broadcast communication via the wireless communication repeater in the conventional electronic shelf label system as described in the patent document 1. Although the signal is transmitted from the server to each of the electronic shelf label devices via the wireless repeater in the broadcast communication, the signal is not transmitted from each of the electronic shelf label devices to the server. Namely, the broadcast communication is one-way communication from the server to each of the electronic shelf label devices. Thus, each of the electronic shelf label devices cannot transmit a signal which indicates that each of the electronic shelf label devices has received a command to the server in the broadcast communication. As a result, the server cannot confirm whether or not each of the electronic shelf label devices has received the signal. Therefore, there is a problem that reliability of communication between the server and each of the electronic shelf label devices is low in the conventional electronic shelf label system. Further, there is a problem that communication speed of the broadcast communication via the dedicated gateway and the wireless communication repeater is slow.

Further, since the conventional electronic shelf label system of the patent document 1 must introduce the dedicated gateway and the dedicated server, it is difficult to introduce and manage the electronic shelf label system. In particular, since it is necessary to secure an installation location, for example, on a ceiling of a store, for installing the dedicated gateway and the dedicated server, it becomes difficult to introduce the electronic shelf label system. Further, using dedicated devices such as the dedicated gateway and the dedicated server increases a cost of introducing and managing the electronic shelf label system. Further, it is difficult to add many different functions and to give expandability to enable a change of use to the conventional electronic shelf label system of the patent document 1. Since the conventional electronic shelf label system lacks expandability, the conventional electronic shelf label system can only provide a shelf label function displaying the product information. Thus, it is hard to find an advantage that is commensurate with the cost of introducing the electronic shelf label system. As a result, there is a problem that the electronic shelf label system is not yet widely available.

RELATED ART DOCUMENTS

Patent Documents

Patent document 1: JP 2012-161478 A

SUMMARY OF THE INVENTION

Problem to be Solved by the Invention

The present invention has been made in view of the above-mentioned problem of the conventional art. Accordingly, it is an object of the present invention to provide an electronic shelf label system which is easy to introduce and manage and has high expandability.

Means for Solving the Problem

This object is achieved by the present inventions defined in the following (1) to (8).
(1) An electronic shelf label system, comprising:
a cluster-type network constructed from a plurality of electronic shelf label devices each of which includes a display which can display information on a plurality of products placed on a plurality of shelving units; and
an application device communicatively connected to the cluster-type network,
wherein the cluster-type network contains:
a shelf label hierarchy constructed from a plurality of electronic shelf label devices each of which functions as a shelf label for the plurality of products among the plurality of electronic shelf label devices, and
a relay hierarchy constructed from a plurality of electronic shelf label devices each of which relays a signal transmitted from the application device to one of the plurality of electronic shelf label devices of the shelf label hierarchy among the plurality of electronic shelf label devices.

(2) The electronic shelf label system according to the above (1), wherein each of the plurality of shelving units includes a plurality of shelf platforms for placing the plurality of products thereon, wherein the relay hierarchy of the cluster-type network contains:

a first hierarchy constructed from an electronic shelf label device related to a group of shelving units constituted of the plurality of shelving units arranged side by side among the plurality of electronic shelf label devices;

a second hierarchy constructed from a plurality of electronic shelf label devices which are respectively related to the plurality of shelving units among the plurality of electronic shelf label devices, wherein each of the plurality of electronic shelf label devices of the second hierarchy is connected to the electronic shelf label device of the first hierarchy related to the group of shelving units to which the shelving unit related to the electronic shelf label device of the second hierarchy belongs through a pairing connection; and a third hierarchy constructed from a plurality of electronic shelf label devices which are respectively related to the plurality of shelf platforms of each of the plurality of shelving units among the plurality of electronic shelf label devices, wherein each of the plurality of electronic shelf label devices of the third hierarchy is connected to the electronic shelf label device of the second hierarchy which is related to the shelving unit to which the shelf platform related to the electronic shelf label device of the third hierarchy belongs through a pairing connection, wherein the shelf label hierarchy contains a product hierarchy which is related to each of the plurality of products placed on the plurality of shelving units among the plurality of electronic shelf label devices, wherein the product hierarchy is constructed from the plurality of electronic shelf label devices which function as the shelf labels for the plurality of products, wherein each of the plurality of electronic shelf label devices of the product hierarchy is connected to the electronic shelf label device of the third hierarchy of the relay hierarchy through a pairing connection, and wherein the electronic shelf label device of the third hierarchy of the relay hierarchy is related to the shelf platform on which the product related to the electronic shelf label device of the product hierarchy is placed.

(3) The electronic shelf label system according to the above (1) or (2), wherein each of the plurality of electronic shelf label devices is configured to enable:

to receive a signal from a communication device which is provided at a shopping basket or a shopping cart used by a customer inside a store where the plurality of shelving units are installed, and to transmit a strength of the signal received from the communication device via the cluster-type network.

(4) The electronic shelf label system according to the above (3), wherein the application device is configured to determine behavior of the customer based on the strength of the signal which is received from the communication device by the electronic shelf label device.

(5) The electronic shelf label system according to the above (4), wherein the plurality of electronic shelf label devices of the shelf label hierarchy transmit data which is obtained by processing the strength of the signal received from the communication device to the plurality of electronic shelf label devices of the relay hierarchy, wherein the plurality of electronic shelf label devices of the relay hierarchy transmit data which is obtained by processing the data received from each of the plurality of electronic shelf label devices of the shelf label hierarchy to the application device, and wherein the application device is configured to determine the behavior of the customer based on the data which is received from the plurality of electronic shelf label devices of the relay hierarchy.

(6) The electronic shelf label system according to any one of the above (1) to (5), wherein each of the plurality of electronic shelf label devices further includes a sensor, and wherein each of the plurality of electronic shelf label devices is configured to enable to transmit sensing data of the sensor via the cluster-type network.

(7) The electronic shelf label system according to any one of the above (1) to (6), wherein each of the plurality of electronic shelf label devices further includes a light emitting unit, and each of the plurality of electronic shelf label devices is configured to drive the light emitting unit according to a command transmitted from the application device via the cluster-type network.

(8) The electronic shelf label system according to the above (2), wherein the pairing connection conforms to a BLE (Bluetooth Low Energy) standard.

Effects of the Invention

The cluster-type network is constructed from the plurality of electronic shelf label devices which are connected to each other through pairing connections conforming to a BLE standard in the electronic shelf label system of the present invention. Further, the application device which controls and utilizes the plurality of electronic shelf label devices is communicatively connected to the cluster-type network. Since the pairing connection allows two-way communication, the electronic shelf label device which has received the signal targeting itself from the application device can transmit a response signal for reporting that the electronic shelf label device has received the signal to the application device via the cluster-type network. Thus, communication between the application device and each of the plurality of electronic shelf label devices is highly reliable in the electronic shelf label system of the present invention.

Further, the same type electronic shelf label devices are connected to each other through the pairing connections according to the BLE standard and construct the cluster-type network, so that the plurality of electronic shelf label devices are controlled via the cluster-type network in the electronic shelf label system of the present invention. Thus, it is unnecessary to introduce a dedicated network with different types of dedicated devices such as a dedicated gateway and a dedicated server, in order to control the plurality of electronic shelf label devices. Therefore, it is possible to significantly reduce a cost of introducing the electronic shelf label system of the present invention. Further, since the cluster-type network is constructed from only the same type of electronic shelf label devices, management of the electronic shelf label system is easy, compared with when the dedicated network is constructed from the different types of dedicated devices.

Further, it is possible to transmit a signal from each of the plurality of electronic shelf label devices to the application device via the cluster-type network in the electronic shelf label system of the present invention. Thus, the application device can obtain data (such as RSSI strength of a signal and sensing data of a sensor) which is obtained by a function provided by each of the plurality of electronic shelf label devices, so that it is possible to utilize the data for various uses. Thus, the electronic shelf label system of the present invention can provide not only a conventional shelf label function but also various functions which utilize the data obtained by the function provided by each of the plurality of electronic shelf label devices. Therefore, the electronic shelf label system of the present invention is highly scalable.

DETAILED DESCRIPTION

Figure 1:
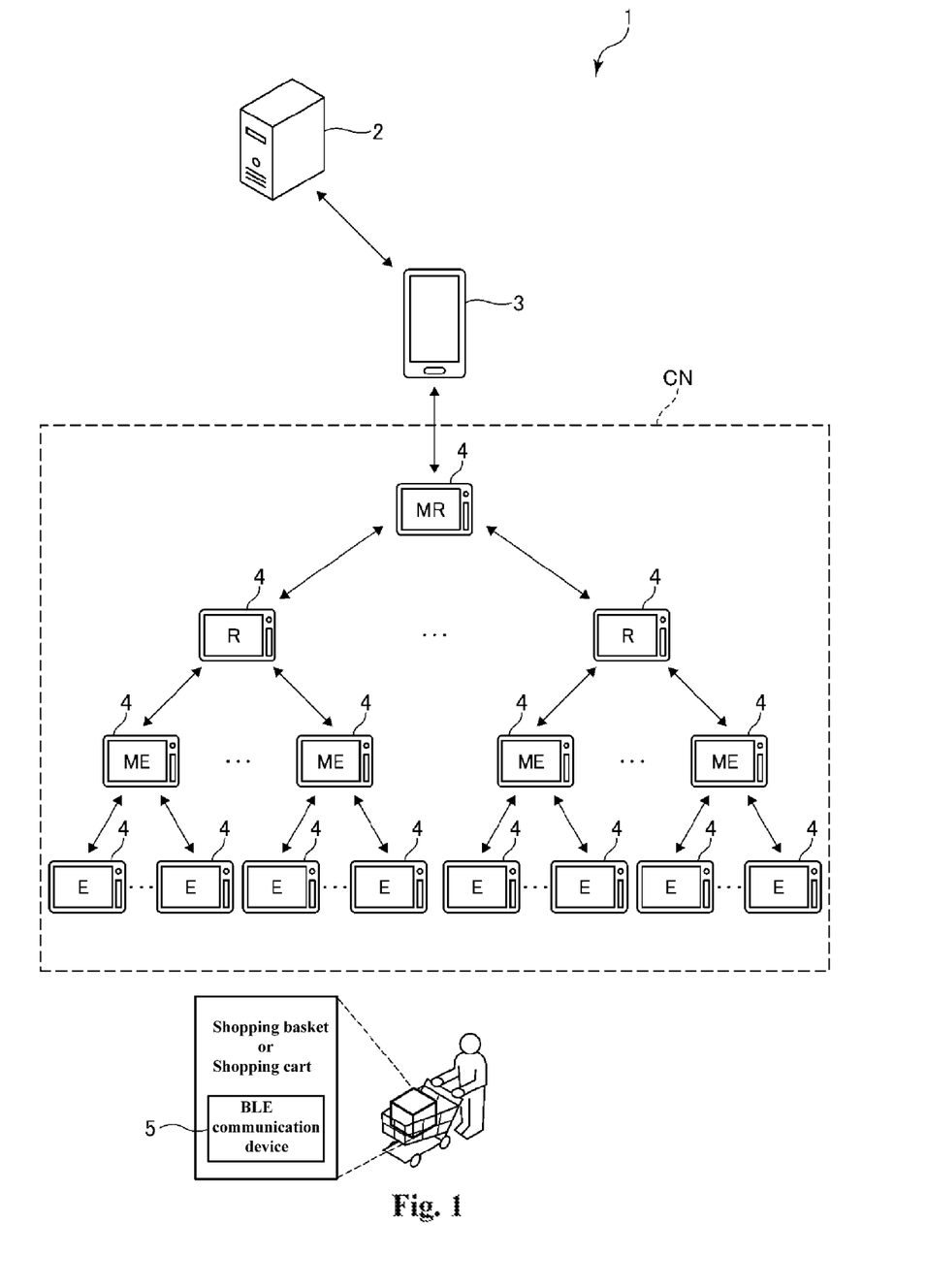
FIG. 1 is a view schematically showing an electronic shelf label system of the present invention.
Figure 2:
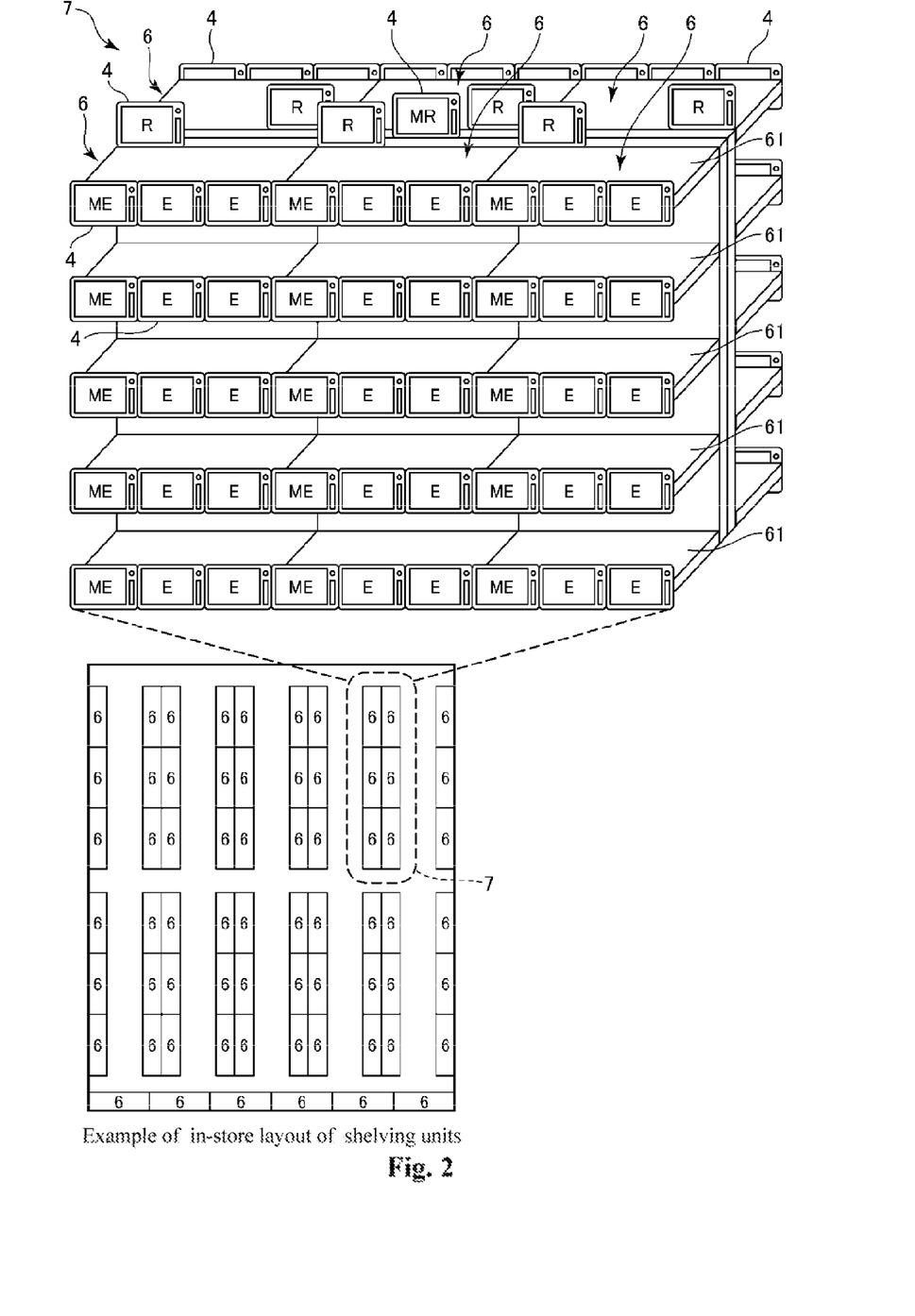
FIG. 2 is a view explaining a role of an electronic shelf label device shown in FIG. 1.
Figure 3:
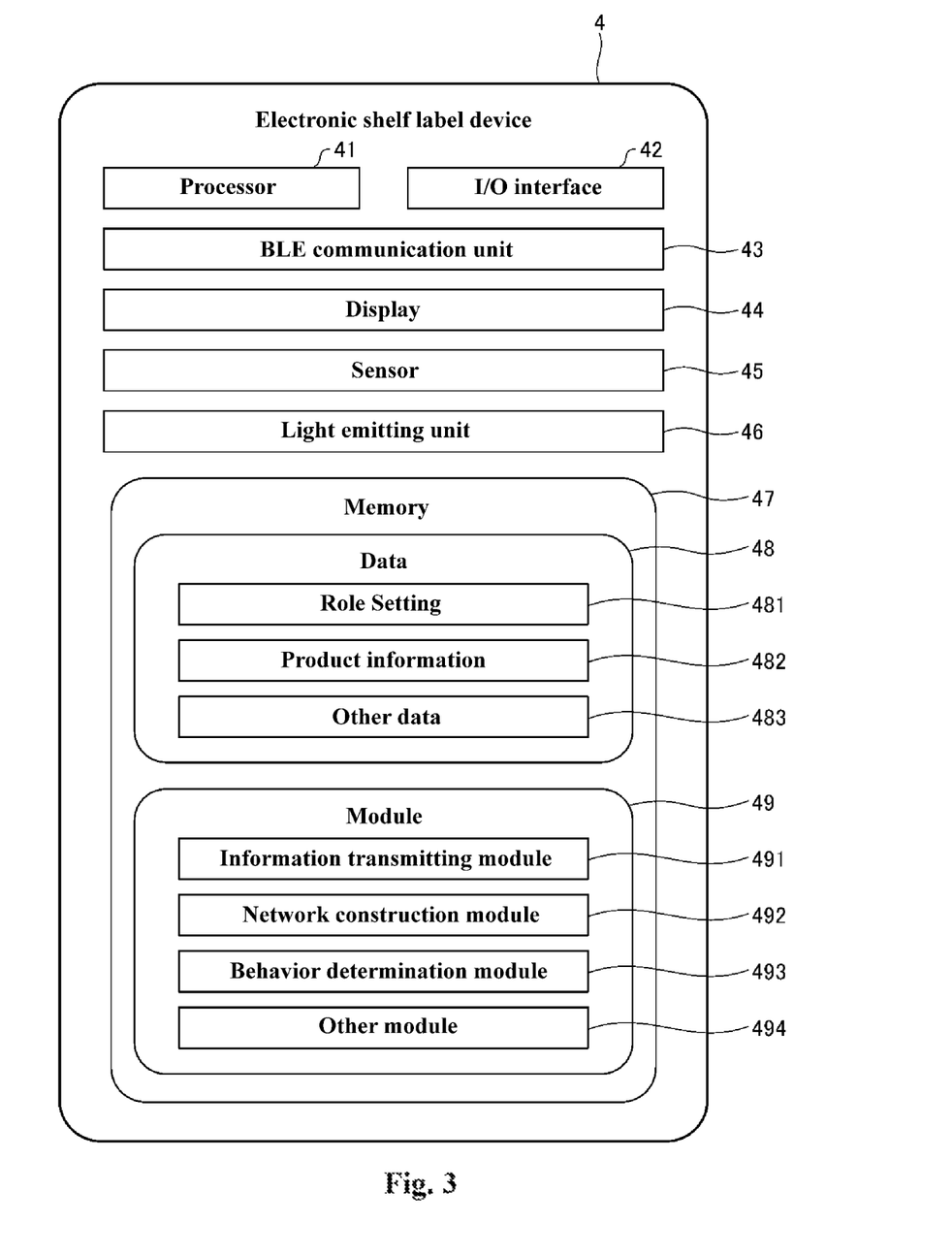
FIG. 3 is a block diagram of the electronic shelf label device shown in FIG. 1.
Figure 4:
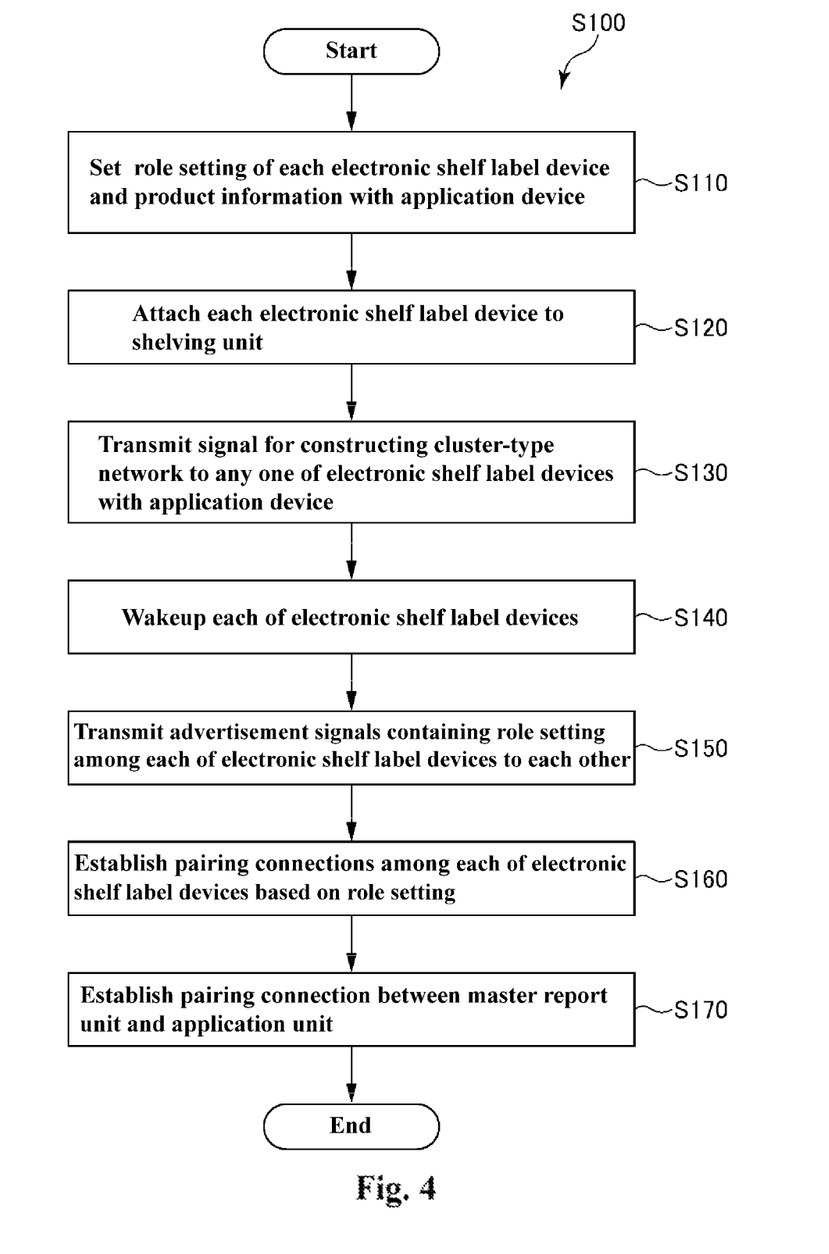
FIG. 4 is a flowchart showing a method for constructing a cluster-type network shown in FIG. 1.
Figure 5:
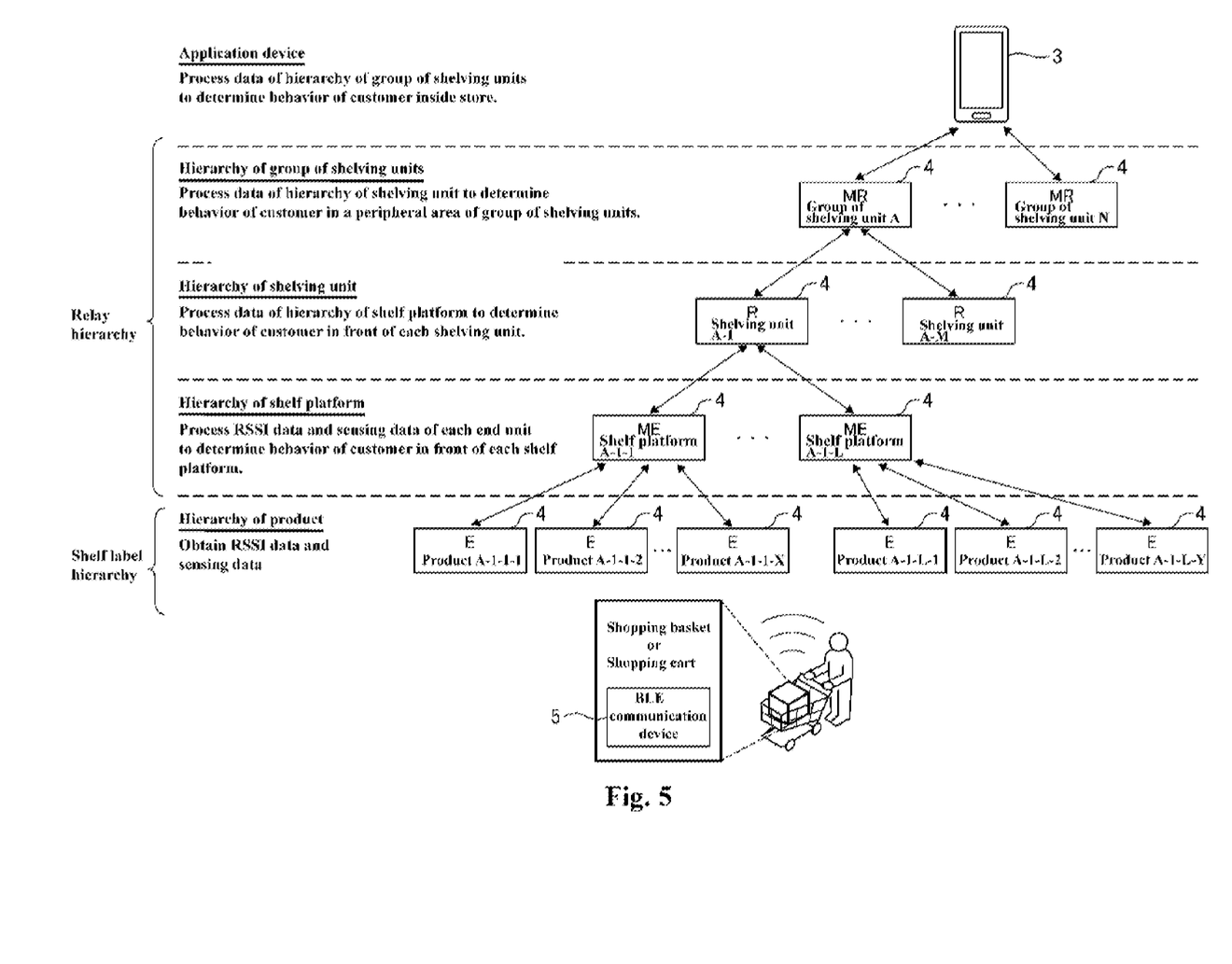
FIG. 5 is a view explaining a process for determining behavior of a customer by the electronic shelf label device shown in FIG. 1.

Hereinafter, an electronic shelf label system of the present invention according to an embodiment of the present invention will be described with reference to FIGS. 1 to 5. FIG. 1 is a view schematically showing an electronic shelf label system of the present invention. FIG. 2 is a view explaining a role of an electronic shelf label device shown in FIG. 1. FIG. 3 is a block diagram of the electronic shelf label device shown in FIG. 1. FIG. 4 is a flowchart showing a method for constructing a cluster-type network shown in FIG. 1. FIG. 5 is a view explaining a process for determining behavior of a customer by the electronic shelf label device shown in FIG. 1.

An electronic shelf label system 1 of the present invention shown in FIG. 1 includes a database 2, an application device 3, one or more cluster-type network CN constructed from a plurality of electronic shelf label devices 4, a BLE communication device 5 provided at a shopping basket or a shopping cart used by a customer inside a store and configured to perform wireless communication according to a BLE (Bluetooth (registered trademark) Low Energy) standard with each of the plurality of electronic shelf label devices 4. The electronic shelf label system 1 is used for controlling and utilizing the plurality of electronic shelf label devices 4 with the application device 3 in a retail store such as a supermarket and a convenience store.

The database 2 is communicably connected to the application device 3 directly or via any network such as the Internet. The database 2 manages the plurality of electronic shelf label devices 4 and stores data used by the application device 3 for providing many different functions utilizing the plurality of electronic shelf label devices 4. For example, the database 2 stores data for POS (Point of Sale System), data for ERP (Enterprise Resource Planning), data for WMS (Warehouse Management System), and data for MES (Manufacturing Execution System). The application device 3 can read and write data which is stored in the database 2 as needed.

The application device 3 may be any information terminal such as a desktop computer, a laptop computer, a notebook computer, a workstation, a tablet computer, a mobile phone, a smartphone, and a PDA. The application device 3 is used for managing the plurality of electronic shelf label devices 4. The application device 3 is communicably connected to the database 2 via a wire communication or a wireless communication. Further, the application device 3 is configured to enable the wireless communication with each of the plurality of electronic shelf label devices 4 through the pairing connection based on the BLE standard. The application device 3 is communicably connected to one or more cluster-type network CN constructed from the plurality of electronic shelf label devices 4. More specifically, the application device 3 is connected to the electronic shelf label device 4 belonging to a top hierarchy of one or more cluster-type network CN through the pairing connection as shown in FIG. 1.

Each of the plurality of electronic shelf label devices 4 is any information terminal such as a tablet computer, a smartphone, and a PDA which can execute the wireless communication based on the BLE standard. The plurality of electronic shelf label devices 4 are wirelessly connected to each other through the pairing connections based on the BLE standard to construct the cluster-type network CN in the electronic shelf label system of the present invention. As shown in FIG. 1, a plurality of electronic shelf label devices 4 belonging to a secondary hierarchy which is one hierarchy level just below the top hierarchy (a primary hierarchy) are connected so as to hang down from one electronic shelf label device 4 belonging to the top hierarchy. Further, a plurality of electronic shelf label devices 4 belonging to a tertiary hierarchy which is one hierarchy level just below the secondary hierarchy are connected so as to hang down from each of the plurality of electronic shelf label devices 4 belonging to the secondary hierarchy. A multi-hierarchy network structure is constructed by repeating above-described connections. The term of "cluster-type network" used in the specification refers to a network topology having the multi-hierarchy network structure as described above. Further, the plurality of electronic shelf label devices 4 belonging to the same hierarchy are not directly connected to each other in the cluster-type network.

The above-described cluster-type network is typically used for collectively controlling the plurality of electronic shelf label devices 4 belonging to a lowest hierarchy of the cluster-type network CN with one application device 3. For example, when the application device 3 transmits a signal targeting any one of the electronic shelf label devices 4 belonging to the lowest hierarchy of the cluster-type network CN to the electronic shelf label device 4 belonging to the top hierarchy of the cluster-type network CN, the electronic shelf label devices 4 belonging to each hierarchy of the cluster-type network CN appropriately relay the signal transmitted from the application device 3 to the electronic shelf label device 4 belonging to the lower hierarchy. Thus, the electronic shelf label device 4 belonging to the lowest hierarchy of the cluster-type network CN can receive the signal targeting itself.

The connection among the plurality of electronic shelf label devices 4 is the pairing connection based on the BLE standard in the cluster-type network CN of the electronic shelf label system 1 of the present invention. The pairing connection allows two-way communication through the wireless communication between a pair of devices connected to each other through the pairing connection. Two devices mutually transmit advertisement signals (advertisement packets) to each other in the pairing connection. The connection (the pairing connection) between the two devices is established after registering each other's pairing information. As described above, the pair of devices connected to each other through the pairing connection can mutually communicate.

FIG. 2 shows an example of an installation of the plurality of electronic shelf label devices 4 to a plurality of shelving units 6 installed inside the store. Each of the plurality of shelving units 6 includes a plurality of shelf platforms 61. A plurality of products are placed on the plurality of shelf platforms 61 according to their categories. Further, as shown in "Example of in-store layout of shelving units" in FIG. 2, the plurality of shelving units 6 are installed by side-by-side or back-to-back arrangement inside the store so as to construct a group of shelving units 7 (also referred to "a gondola"). A plurality of groups of shelving units 7 can be arranged inside the store with any layout to ensure a space through which the customer passes.

FIG. 1 shows an example of the cluster-type network CN of the electronic shelf label system 1 of the present invention. The example of the cluster-type network CN shown in FIG. 1 corresponds to any one of the plurality of groups of shelving units 7 arranged on a floor inside the store. The number of cluster-type networks CN shown in FIG. 1 may correspond to the number of groups of shelving units 7 installed inside the store. Thus, the number of cluster-type networks CN shown in FIG. 1 can be equal to the number of groups of shelving units 7 installed inside the store. Although the application device 3 is communicably connected to one cluster-type network CN in an aspect shown in FIG. 1, the present invention is not limited thereto. For example, the scope of the present invention involves an aspect in which the application device 3 is communicably connected to two or more cluster-type networks CN respectively corresponding to different groups of shelving units 7. For example, the scope of the present invention involves an aspect in which very large numbers of groups of shelving units 7 exist on the floor in one store and the cluster-type networks CN whose number corresponds to the number of groups of shelving units 7 are connected to the application device 3.

The plurality of electronic shelf label devices 4 function as any one of four roles containing a master reporter unit MR which is related to any one of the plurality of groups of shelving units 7 installed inside the store, a reporter unit R which is related to any one of the plurality of shelving units 6 of each group of shelving units 7, a master end unit ME which is related to any one of the plurality of shelf platforms 61 of each shelving unit 6, and an end unit E which is related to any one of the plurality of products placed on each shelf platform 61 of each shelving unit 6 in the cluster-type network CN.

The master reporter unit MR is related to any one of the plurality of groups of shelving units 7 installed inside the store. Further, the master reporter unit MR is connected to the application device 3 through the pairing connection. The master reporter unit MR constitutes a hierarchy of the group of shelving units 7, which is the top hierarchy of the cluster-type network CN (a first hierarchy) in the cluster-type network CN. The master reporter unit MR relays a signal, which is received from the application device 3 and targets the electronic shelf label device 4 belonging to the lower hierarchy, to the appropriate electronic shelf label device 4 belonging to the lower hierarchy. Further, the master reporter unit MR is typically attached to any part of any one of the shelving units 6 constituting the group of shelving units 7 to which the master reporter unit MR is related as shown in FIG. 2.

The reporter unit R is related to any one of the plurality of shelving units 6 constituting the group of shelving units 7. Further, the reporter unit R is connected to the master reporter unit MR related to the group of shelving units 7 to which the shelving unit 6 related to the reporter unit R belongs through the pairing connection so as to hang down from the master reporter unit MR. The plurality of reporter units R constitute the hierarchy of shelving unit 6 (a second hierarchy) which is one hierarchy level just below the hierarchy of group of shelving units 7 (the first hierarchy) in the cluster-type network CN. The reporter unit R relays the signal, which is received from the application device 3 via the master reporter unit MR and targets the electronic shelf label device 4 belonging to the lower hierarchy, to the appropriate electronic shelf label device 4 belonging to the lower hierarchy. Further, the reporter unit R is attached to any part of the shelving unit 6 to which the reporter unit R is related as shown in FIG. 2.

The master end unit ME is related to any one of the plurality of shelf platforms 61 of the shelving units 6. Further, the master end unit ME is connected to the reporter unit R related to the shelving unit 6 to which the shelf platform 61 related to the master end unit ME belongs through the pairing connection so as to hang down from the reporter unit R. The plurality of master end units ME constitute a hierarchy of the shelf platform 61 (a third hierarchy) which is one hierarchy level just below the hierarchy of shelving unit 6 (the second hierarchy) in the cluster-type network CN. The master end unit ME relays the signal, which is received from the application device 3 via the master reporter unit MR and the reporter unit R and targets an electronic shelf label device 4 belonging to the lower hierarchy, to the appropriate electronic shelf label device 4 belonging to the lower hierarchy than the third hierarchy. Further, the master end unit ME is attached to a left end part or a right end part on a front surface of the shelf platform 61 to which the master end unit ME is related as shown in FIG. 2. The master end unit ME may be further related to the plurality of products placed on the shelf platform 61 of the shelving unit 6 to which the master end unit ME is related. In this case, the master end unit ME can function as shelf labels for one or more of the plurality of products related to the master end unit ME by displaying product information 482 (see FIG. 3) on one or more of the plurality of products to which the master end unit ME related on its own display 44 (see FIG. 3).

The end unit E is related to any one of the plurality of products placed on the shelf platform 61 of the shelving units 6 according to their categories. Further, the end unit E is connected to the master end unit ME related to the shelf platform 61 on which the product related to the end unit E is placed through the pairing connection so as to hang down from the master end unit ME. The plurality of end units E constitute a hierarchy of product (a fourth hierarchy) which is one hierarchy level just below the hierarchy of shelf platform 61 (the third hierarchy) in the cluster-type network CN. Further, the end unit E is attached to the front surface of the shelf platform 61 on which the product related to the end unit E is placed so as to be located adjacent to the product related to itself as shown in FIG. 2. The end unit E can function as the shelf label for the product related to itself by displaying the product information 482 (see FIG. 3) on the product related to itself on its own display 44 (see FIG. 3).

Since the end unit E functions as the shelf label for the product as described above, the hierarchy of product (the fourth hierarchy) constituted of the plurality of end units E may be considered as a shelf label hierarchy constituted of the plurality of electronic shelf label devices 4 functioning as the shelf labels for the plurality of products. Further, when the master reporter unit MR, the reporter unit R, and the master end unit ME have received the signal targeting the electronic shelf label device 4 belonging to the lower hierarchy than thereof, the master reporter unit MR, the reporter unit R, and the master end unit ME function as a wireless repeater which relays the signal to the appropriate electronic shelf label device 4 belonging to the lower hierarchy. Thus, the hierarchy of group of shelving units 7 (the first hierarchy), the hierarchy of shelving unit 6 (the second hierarchy), and the hierarchy of shelf platform 61 (the third hierarchy) may be considered as a relay hierarchy relaying the signal transmitted from the application device 3 to any one of the end units E belonging to the product hierarchy (the fourth hierarchy). Therefore, the cluster-type network CN roughly contains the shelf label hierarchy constituted of the plurality of electronic shelf label devices 4 functioning as the shelf labels for the plurality of products, and the relay hierarchy constituted of the plurality of electronic shelf label devices 4 for relaying the signal transmitted from the application device 3 to any one of the end units E to the plurality of electronic shelf label devices 4 (the end units E) of the shelf label hierarchy. The shelf label hierarchy contains the hierarchy of product (the fourth hierarchy) constituted of the plurality of end units E functioning as the shelf labels for the products in the illustrated embodiment. The relay hierarchy contains the hierarchy of group of shelving units 7 (the first hierarchy) constituted of the master reporter unit MR, the hierarchy of shelving unit 6 (the second hierarchy) constituted of the plurality of reporter units R, and the hierarchy of shelf platform 61 (the third hierarchy) constituted of the plurality of master end units ME in the illustrated embodiment. If the master end unit ME is further related to the plurality of products placed on the shelf platform 61 of the shelving unit 6 to which the master end unit ME is related, the master end unit ME can function as one or more shelf labels of the plurality of products to which the master end unit ME is related. In this case, the hierarchy of shelf platform 61 (the third hierarchy) constituted of the plurality of master end units ME functions as the relay hierarchy and also functions as the shelf label hierarchy.

When the application device 3 transmits the signal targeting any one of the plurality of electronic shelf label devices 4 constituting the cluster-type network CN to the master reporter unit MR, the signal from the application device 3 is relayed to the targeted electronic shelf label device 4 through the pairing connections among the plurality of electronic shelf label devices 4 in the electronic shelf label system 1 of the present invention. The electronic shelf label device 4 which has received the signal targeting itself performs a process according to the signal from the application device 3. Thus, the application device 3 can collectively control the plurality of electronic shelf label devices 4 by transmitting the signal to the plurality of electronic shelf label devices 4 through one or more pairing connections.

Further, since the pairing connection allows the two-way communication through the wireless communication between the pair of devices connected through the pairing connection as described above, it is possible to transmit the signal not only from the electronic shelf label device 4 belonging to the higher hierarchy to the electronic shelf label device 4 belonging to the lower hierarchy but also from the electronic shelf label device 4 belonging to the lower hierarchy to the electronic shelf label device 4 belonging to the higher hierarchy in the cluster-type network. Thus, it is possible to transmit data obtained by a function provided by each electronic shelf label device 4 (for example, strength data of a signal of communication with the BLE communication device 5 and the sensing data of the sensor as described below) to the electronic shelf label device 4 belonging to the higher hierarchy. The data obtained by the electronic shelf label device 4 is finally transmitted to the application device 3, so that the application device 3 can utilize the data for different uses. Thus, the electronic shelf label system 1 of the present invention can provide not only a conventional shelf label function but also various functions which utilize the data obtained by the function provided by each of the plurality of electronic shelf label devices 4. Therefore, the electronic shelf label system 1 of the present invention is highly scalable.

Further, since the two-way communication is possible through the pairing communication, the electronic shelf label device 4 which has received the signal targeting itself from the application device 3 can transmit a response signal reporting that the electronic shelf label device 4 has received the signal via the cluster-type network CN to the application device 3. Thus, communication between the application device 3 and each of the plurality of electronic shelf label devices 4 is highly reliable in the electronic shelf label system 1 of the present invention.

Further, the cluster-type network CN is constructed by connecting the same type electronic shelf label devices 4 each other through the pairing connections according to the BLE standard, so that the plurality of electronic shelf label devices 4 are controlled through the cluster-type network CN in the electronic shelf label system 1 of the present invention. Thus, it is unnecessary to construct a dedicated network with different types of dedicated devices such as a dedicated gateway and a dedicated server, in order to control the plurality of electronic shelf label devices 4. Therefore, it is possible to significantly reduce a cost of introducing the electronic shelf label system 1 of the present invention. Further, since the cluster-type network CN is constructed from only the same type electronic shelf label devices 4, management of the electronic shelf label system 1 is easy compared with when the network is constructed with the different types of dedicated devices.

Although the top hierarchy of the relay hierarchy of the cluster-type network CN is the hierarchy of group of shelving units 7 (the first hierarchy) in the aspect shown in FIG. 1 and FIG. 2, the present invention is not limited thereto. The scope of the present invention also involves an aspect in which there are a plurality of master reporter units MR and the relay hierarchy of the cluster-type network CN contains one or more hierarches higher than the hierarchy of group of shelving units 7 (the first hierarchy) such as a store hierarchy constituted of units related to the store where the plurality of groups of shelving units 7 are installed. In this case, each of the units related to the store is connected to each of the plurality of master reporter units MR through the pairing communication and the application device 3 is connected to one or more units belonging to the highest hierarchy of the relay hierarchy of the cluster-type network CN. Namely, in the electronic shelf label system 1 of the present invention, the cluster-type network CN is only required to contain the shelf label hierarchy constituted of the plurality of electronic shelf label devices 4 (the end unit E) functioning as the shelf label s for the products, and the relay hierarchy constituted of the plurality of electronic shelf label devices 4 for relaying the signal transmitted from the application device 3 to the plurality of electronic shelf label devices 4 (the end units E) of the shelf label hierarchy. The number of hierarchies in the relay hierarchy and the type of a target to which the electronic shelf label device 4 belonging to each hierarchy in the relay hierarchy is related may appropriately change as needed (depending on some factors such as a scale of the system) in the electronic shelf label system 1 of the present invention.

As shown FIG. 3, each of the electronic shelf label devices 4 used in the electronic shelf label system 1 of the present invention contains one or more processors 41 for performing control of the electronic shelf label device 4, an I/O (input/output) interface 42 for performing input to the electronic shelf label device 4 and output from the electronic shelf label device 4, a BLE communication unit 43 for performing the wireless communication according to the BLE standard, a display 44 which allows to display the product information 482, a sensor 45, a light emitting unit 46, one or more memories 47 storing data 48 and modules 49 used for performing processing of the electronic shelf label system 1.

The one or more processors 41 are arithmetic units such as one or more microprocessors, microcomputers, microcontrollers, digital signal processors (DSPs), central processing units (CPUs), memory control units (MCUs), graphics processing units (GPUs), state-machines, logic circuits, application-specific integrated circuits (ASIC) and combinations thereof which can perform arithmetic operations such as signal manipulation based on computer readable instructions. In particular, the processor 41 is configured to fetch computer-readable instructions (e.g., data, programs and modules) stored in the memory 47 to perform operations, signal manipulation and control.

The I/O interface 42 contains various software and hardware interfaces such as a web interface and a graphical user interface (GUI). For example, the I/O interface 42 is an interface for peripheral devices such as a keyboard, a mouse, a touch panel display, an external memory, a printer and a display. The I/O interface 42 enables input to the electronic shelf label device 4 through an input device such as a keyboard, a mouse and a touch panel display and output from the electronic shelf label device 4 to a display, a printer, an external memory and the like. The I/O interface 42 may also allow the electronic shelf label device 4 to communicate with any external device such as an externally provided web server or data server via a network such as the Internet.

The BLE communication unit 43 is a unit used for performing the wireless communication according to the BLE standard. The BLE communication unit 43 contains components which are needed for performing the wireless communication according to the BLE standard such as an antenna, a transmission/reception circuit and a modulation/demodulation circuit to perform the wireless communication according to the BLE standard among the application device 3, the other plurality of electronic shelf label devices 4, and the BLE communication device 5 in response to the control from the processor 41. The electronic shelf label device 4 can use the BLE communication unit 43 to transmit and receive an advertisement signal among the application device 3, the other plurality of electronic shelf label devices 4, and the BLE communication device 5. The advertisement signal can contain an arbitrary command, data and information. Therefore, by appropriately changing the command, the data, the information and the like contained in the advertisement signal and exchanging the advertisement signal with each of the application device 3, the other plurality of electronic shelf label devices 4, and the BLE communication device 5, the electronic shelf label device 4 can perform necessary communication among the application device 3, the other plurality of electronic shelf label devices 4, and the BLE communication device 5 without using any unique signal.

In particular, the electronic shelf label device 4 performs the wireless communication according to the BLE standard with the BLE communication device 5 provided at the shopping basket or the shopping cart used by the customer inside the store through the BLE communication unit 43 to receive the advertisement signal from the BLE communication device 5. Since the wireless communication between the BLE communication unit 43 of the electronic shelf label device 4 and the BLE communication device 5 conforms to the BLE standard, the strength of the advertisement signal transmitted from the BLE communication device 5 is defined by the BLE standard. On the other hand, the strength of the advertising signal transmitted from the BLE communication device 5 and received by the BLE communication unit 43 of the electronic shelf label device 4 is inversely proportional to a separation distance between the electronic shelf label device 4 and the BLE communication device 5. The electronic shelf label device 4 which has received the advertisement signal from the BLE communication device 5 can refer to the strength of the received signal (RSSI: Received Signal Strength Indication) of the advertisement signal to calculate the separation distance between the electronic shelf label device 4 and the BLE communication device 5. The strength of the received signal of the advertisement signal obtained by each electronic shelf label device 4 can be utilized for determining the behavior of the customer inside the store as described below.

The display 44 is a display unit for displaying any information in response to control from the processor 41. A liquid crystal display or an electronic paper may be utilized as the display 44. When the electronic shelf label device 4 functions as the master reporter unit MR, the reporter unit R, or the master end unit ME, the display 44 may display information for identifying the group of shelving units 7, the shelving unit 6, or the shelf platform 61 related to the electronic shelf label device 4 (for example, information such as "the group of shelving units A", "the shelving unit A-1" which means the first shelving unit belonging to the group of shelving units A, "the shelf platform A-1-1" which means the first shelf platform of the first shelving unit belonging to the group of shelving units A). When the electronic shelf label device 4 functions as the end unit E, the display 44 displays the product information 482 relating to a product related to the electronic shelf label device 4 (for example, a product name, a product price, an expiration date, a best-before date, a producing district, a product barcode, sale information).

The sensor 45 is used for obtaining the sensing data relating to a surrounding environment of the electronic shelf label device 4 and/or relating to the customer who passes in front of the electronic shelf label device 4. The sensor 45 contains at least one of an image sensor, a voice sensor, a temperature sensor, a humidity sensor, an illuminance sensor, a human detecting sensor, a nearby sensor, an acceleration sensor, and a touch sensor. The sensing data obtained by the sensor 45 can be utilized for the function for determining the behavior of the customer inside the store and/or for many different uses as described below.

The light emitting unit 46 has a function of emitting light in response to the control from the processor 41. The light emitting unit 46 may be an LED (Light Emitting Diode) or the like. When the electronic shelf label device 4 has received the signal targeting itself and commanding to drive the light emitting unit 46 from the application device 3 via the cluster-type network CN, the processor 41 of the electronic shelf label device 4 drives the light emitting unit 46 in response to the signal from the application device 3. For example, the light emitting unit 46 is used for the following uses. When a user of the application device 3 (a staff) wants to identify a position of any one of the plurality of electronic shelf label devices 4 arranged inside the store, the user uses the application device 3 to transmit the signal targeting the electronic shelf label device 4 whose position is needed to be identified by the user to the cluster-type network CN for driving the light emitting unit 46. The electronic shelf label device 4 which has received the signal targeting itself drives the light emitting unit 46. With this configuration, the user can recognize that the electronic shelf label device 4 emitting light is the electronic shelf label device 4 whose position needed to be identified by the user. Further, when the user of the application device 3 is asked a question from the customer about a location where a desired product is placed in the store, the user uses the application device 3 to transmit the signal targeting the electronic shelf label device 4 related to the desired product that the customer wants to the cluster-type network CN for driving the light emitting unit 46. The electronic shelf label device 4 which has received the signal targeting itself drives the light emitting unit 46. With this configuration, the customer can find the desired product that the customer wants by finding the electronic shelf label device 4 emitting light.

The memory 47 is a computer-readable medium containing a volatile storage medium (such as a RAM, a SRAM and a DRAM), a non-volatile storage medium (such as a ROM, an EPROM, an EEPROM, a flash memory, a hard disk, an optical disc, a CD-ROM, a digital versatile disc (DVD), a Blue-ray disc, a magnetic cassette, a magnetic tape, a magnetic disk) and combinations thereof.

The memory 47 is communicatively connected to the processor 41 and stores the data 48 required for allowing the electronic shelf label device 4 to perform processing and the plurality of modules 49 which can be executed by the processor 41. In addition, the memory 47 has a function of temporarily storing data received, processed, and generated by one or more of the plurality of modules 49 and data required for performing processing of the plurality of modules 49.

The data 48 stored in the memory 47 contains role setting 481 relating the electronic shelf label device 4 to the group of shelving units 7, the shelving unit 6, the shelf platform 61, or the product, the product information 482 of the product related to itself in a case where the electronic shelf label device 4 functions as the end unit E related to the product, and any number of other data 483 required for performing the processing of the electronic shelf label device 4.

The role setting 481 is stored in the memory 47 so as to be rewritable based on the signal from the application device 3. The role setting 481 is set based on the signal from the application device 3 when the electronic shelf label device 4 is attached to the shelving unit 6 inside the store. The application device 3 transmits a signal containing information for identifying the group of shelving units 7, the shelving unit 6, the shelf platform 61, or the product via the wireless communication when the electronic shelf label device 4 is attached to the shelving unit 6 inside the store. The electronic shelf label device 4 stores information contained in the received signal as the role setting 481 in the memory 47. The information contained in the signal transmitted from the application device 3 to the electronic shelf label device 4 when the electronic shelf label device 4 is attached to the shelving unit 6 inside the store is typically a domain address for identifying the group of shelving units 7, the shelving unit 6, the shelf platform 61, or the product. The domain address may be such as "Product A-1-1-1" representing a product placed at the first from the left (or right) on the first shelf platform 61 of the first shelving unit 6 belonging to the group A of shelving units 7. When this information is stored in the memory 47 as the role setting 481, the electronic shelf label device 4 is related to the group of shelving units 7, the shelving unit 6, the shelf platform 61, or the product identified by the information.

In a case where the electronic shelf label device 4 is related to the group of shelving units 7, the electronic shelf label device 4 functions as the master reporter unit MR. In a case where the electronic shelf label device 4 is related to the shelving unit 6, the electronic shelf label device 4 functions as the reporter unit R. In a case where the electronic shelf label device 4 is related to the shelf platform 61, the electronic shelf label device 4 functions as the master end unit ME. In a case where the electronic shelf label device 4 is related to the product, the electronic shelf label device 4 functions as the end unit E. After the electronic shelf label device 4 is related to the group of shelving units 7, the shelving unit 6, the shelf platform 61, or the product by the application device 3, the user of the application device 3 attaches each of the plurality of electronic shelf label devices 4 to a position according to the role setting 481. As a result, the electronic shelf label device 4 is arranged inside the store. Further, since the application device 3 can transmit the signal to each of the plurality of electronic shelf label devices 4 via the cluster-type network CN as described above, the user of the application device 3 can also transmit the signal to each of the plurality of electronic shelf label devices 4 at any timing to rewrite the role setting 481 of each of the plurality of electronic shelf label devices 4.

The product information 482 is information on the product related to the electronic shelf label device 4 when the electronic shelf label device 4 functions as the end unit E. For example, the product information 482 contains the product name, the product price, a product management code, the best-before date, the expiration date, and the producing district. The product information 482 is written in the memory 47 based on the signal from the application device 3. The product information 482 is typically written in the memory 47 of the electronic shelf label device 4 by transmitting the information on the product from the application device 3 to the electronic shelf label device 4 when the electronic shelf label device 4 is attached to the shelving unit 6 inside the store. Further, since the application device 3 can transmit the signal to each of the plurality of electronic shelf label devices 4 via the cluster-type network CN as described above, the user of the application device 3 can also transmit the signal to each of the plurality of electronic shelf label devices 4 at any timing to rewrite the product information 482 of each of the plurality of electronic shelf label devices 4. In a case where the master end unit ME is further related to the plurality of products placed on the shelf platform 61 of the shelving unit 6 to which the master end unit ME is related, the product information 482 corresponding to each of the related plurality of products is written in the memory 47 of the electronic shelf label device 4 functioning as the master end unit ME. The product information 482 written in the memory 47 of the electronic shelf label device 4 functioning as the master end unit ME can also rewrite by the user of the application device 3 at any timing.

The other data 483 contains network information on the cluster-type network CN. For example, the network information may contain many different data which are needed for communication in the cluster-type network CN such as a communication routing table, a network key, and an address. The other data 483 further contains any data which is needed for performing the process of the electronic shelf label device 4.

When the electronic shelf label device 4 functions as the end unit E, the electronic shelf label device 4 displays any one or more of the product information 482 (for example, the product name, the product price, the expiration date and the like) on the display 44. When the electronic shelf label device 4 functions as the end unit E, the customer can obtain the information on the product by referring the product information 482 displayed on the display 44 of the electronic shelf label device 4 since the electronic shelf label device 4 is attached to the front surface of the shelf platform 61 of the shelving unit 6 so as to be located adjacent to the product which is related to itself.

Further, since the user of the application device 3 can transmit the signal to each of the plurality of electronic shelf label devices 4 at any timing to rewrite the product information 482 of each of the plurality of electronic shelf label devices 4, it is possible to easily run a promotional campaign such as a limited-time sale in which the product price is lowered by rewriting the product information 482 of each of the plurality of electronic shelf label device 4 at any timing. Further, when the product placed on the shelving unit 6 is replaced, the user of the application device 3 transmits the signal to the targeted electronic shelf label devices 4 to rewrite the product information 482 of electronic shelf label device 4. With this configuration, since the product information 482 displayed on the display 44 of the electronic shelf label devices 4 is changed, replacing the product does not take time and effort.

The modules 49 stored in the memory 47 are computer readable instructions executable by the processor 41, such as routines, applications, programs, algorithms, libraries, objects, components, data structures and combinations thereof.

The modules 49 contain an information transmitting module 491 for transmitting the advertisement signal containing the role setting 481 thereof, a network construction module 492 for establishing pairing connections to construct the cluster-type network CN, a behavior determination module 493 for determining the behavior of the customer based on the strength of the signal (RSSI) received from the BLE communication device 5 provided at the shopping basket and/or the shopping cart by each electronic shelf label device 4 and/or the sensing data obtained by the sensor 45 of each electronic shelf label device 4, and any number of other modules 494 for complementing the functions provided by the electronic shelf label device 4.

The information transmitting module 491 is used for transmitting the advertisement signal containing the role setting 481 stored in the memory 47 thereof to the other electronic shelf label devices 4 or the application device 3. When the electronic shelf label device 4 has received the signal for constructing the cluster-type network CN from the application device 3, the electronic shelf label device 4 and the other electronic shelf label devices 4 mutually transmit the advertisement signals containing the role setting 481 stored in the memory 47 thereof to each other. As a result, the electronic shelf label device 4 obtains the role setting 481 of the other electronic shelf label devices 4. The obtained role setting 481 of the other electronic shelf label devices 4 is temporarily stored in the memory 47.

The network construction module 492 is used for appropriately establishing the pairing connections with the other electronic shelf label devices 4 by referring the role setting 481 thereof and the role setting 481 of the other electronic shelf label devices 4 stored in the memory 47. In particular, the network construction module 492 refers to the role setting 481 thereof and the role setting 481 of the other electronic shelf label devices 4 stored in the memory 47 to identify the other electronic shelf label device 4 to which the electronic shelf label device 4 should be connected through the pairing connection so as to hang down. After that, the network construction module 492 establishes the pairing connections with the identified other electronic shelf label device 4. For example, if the role setting 481 thereof stored in the memory 47 is "Product A-1-1-1" representing the product placed at the first from the left (or right) on the first shelf platform 61 of the first shelving unit 6 belonging to the group A of shelving units 7, the network construction module 492 refers to the role setting 481 thereof stored in the memory 47 to identify that the electronic shelf label device 4 should be connected through the pairing connection so as to hang down from the other electronic shelf label device 4 related to "the first shelf platform 61 of the first shelving unit 6". Further, the network construction module 492 refers to the role setting 481 of the other electronic shelf label devices 4 stored in the memory 47 to identify the other electronic shelf label device 4 related to "the first shelf platform 61 of the first shelving unit 6". After that, the network construction module 492 establishes the pairing connection with the other electronic shelf label device 4 related to "the first shelf platform 61 of the first shelving unit".

FIG. 4 shows a method S100 for constructing the cluster-type network CN using the information transmitting module 491 and the network construction module 492. At a step S110, the user of the application device 3 connects to each of the plurality of electronic shelf label devices 4, which should be used for constructing the cluster-type network CN through the pairing connections using the application device 3. After that, the user of the application device 3 sets the role setting 481 of each of the plurality of electronic shelf label devices 4 and relates each of the plurality of electronic shelf label devices 4 to the group of shelving units 7, the shelving unit 6, the shelf platform 61, or the product. At this time, the user of the application device 3 further sets the electronic shelf label device 4 related to the product, that is, the product information 482 of the end unit E. Each of the plurality of electronic shelf label devices 4 whose role setting 481 is set displays the setup role setting 481 on the display 44 thereof. At the time of the step S110, the plurality of electronic shelf label devices 4 are not connected to each other through the pairing connections.

At a step S120, the user of the application device 3 refers to the role setting 481 displayed on the display 44 of each of the plurality of electronic shelf label devices 4 to identify the position at which each of the plurality of electronic shelf label devices 4 should be attached (for example, a specific position on the shelving unit 6, the shelf platform 61, or the front surface of the shelf platform 61). After that, the user of the application device 3 attaches each of the plurality of electronic shelf label devices 4 to the identified position.

At a step S130, the user of the application device 3 uses the application device 3 to establish the pairing connection to any one of the plurality of electronic shelf label devices 4 attached to the positions to transmit the signal for starting construction of the cluster-type network CN. At this time, the electronic shelf label device 4 which has received the signal for starting the construction of the cluster-type network CN from the application device 3 is activated. At a step S140, the activated electronic shelf label device 4 wirelessly transmits a wake-up advertisement signal to each of the other electronic shelf label devices 4 for waking up each of the other electronic shelf label devices 4. As a result, each of the other electronic shelf label devices 4 is activated.

At a step S150, each of the plurality of electronic shelf label device 4 uses the information transmitting module 491 to generate the advertisement signal containing the role setting 481 stored in its own the memory 47. Next, each of the plurality of electronic shelf label device 4 and the other electronic shelf label devices 4 mutually transmit the advertisement signals. When each of the plurality of electronic shelf label devices 4 has received the advertisement signals from the other electronic shelf label devices 4, each of the plurality of electronic shelf label device 4 temporarily stores the role setting 481 of the other electronic shelf label devices 4 in its own memory 47. At a step S160, each of the plurality of electronic shelf label devices 4 refers to its own role setting 481 and the role setting 481 of the other electronic shelf label devices 4 stored in the memory 47 using the network construction module 492 to establish the pairing connections with the appropriate other electronic shelf label devices 4. As a result, the cluster-type network CN is constructed. After that, at a step S170, the pairing connections between the master reporter unit MR which is the electronic shelf label device 4 belonging to the top hierarchy of the cluster-type network CN and the application device 3 is established, so that the application device 3 is connected to the cluster-type network CN to finish the method S100. As described above, each of the plurality of electronic shelf label devices 4 automatically establishes the pairing connections with the appropriate other electronic shelf label devices 4 based on its own role setting 481 set by the application device 3 to construct the cluster-type network CN.

Referring back to FIG. 3, the behavior determination module 493 is configured to determine the behavior of the customer based on the strength of the signal (RSSI) from the BLE communication device 5 and the sensing data which are received by each of the electronic shelf label devices 4 belonging to the lower hierarchy. As described above, since the cluster-type network CN is constructed by the pairing connections allowing the two-way communication, it is possible to transmit the signal from the electronic shelf label device 4 belonging to the lower hierarchy to the electronic shelf label device 4 belonging to the higher hierarchy. Thus, the electronic shelf label device 4 belonging to the higher hierarchy can collect the strength of the signal (RSSI data) from the BLE communication device 5 and the sensing data which are obtained by each of the electronic shelf label devices 4 belonging to the lower hierarchy.

The strength of the signal (the RSSI data) from the BLE communication device 5 obtained by each electronic shelf label device 4 corresponds to the separation distance from the electronic shelf label device 4 to the BLE communication device 5. Thus, it is possible to identify a position of the BLE communication device 5, that is, a position of the customer using the shopping basket or the shopping cart provided with the BLE communication device 5 by referring to the strength of the signal (the RSSI data) from the BLE communication device 5 obtained by each plurality of electronic shelf label devices 4 based on the principle of triangulation. Further, it is possible to determine a flow line of the customer inside the store by identifying the position of the customer in real time.

Further, it is possible to determine the behavior of the customer from the sensing data obtained by each of the electronic shelf label devices 4 belonging to the lower hierarchy. For example, if the sensor 45 is the image sensor, the behavior determination module 493 detects a movement such as a change of posture and approach to the product of the customer from the image data obtained as the sensing data. As described above, the behavior determination module 493 can determine the behavior of the customer containing the flow line and the movement of the customer based on the strength of the signal (the RSSI data) from the BLE communication device 5 and the sensing data which are obtained by each of the electronic shelf label devices 4 belonging to the lower hierarchy.

FIG. 5 shows an overview of a behavior determination process of the customer which is performed by the plurality of electronic shelf label devices 4 constructing the cluster-type network CN. In the aspect shown in FIG. 5, the application device 3 is connected to each of the master reporter units MR of the plurality of cluster-type networks CN respectively corresponding to the plurality of groups of shelving units 7 arranged inside the store through the pairing connections.

The customer moves with the shopping basket or the shopping cart provided with the BLE communication device 5 inside the store. At this time, the BLE communication device 5 transmits the advertisement signal to each of the plurality of end units E attached to the plurality of shelving units 6 installed inside the store. Since the advertisement signal transmitted from the BLE communication device 5 contains information for identifying the BLE communication device 5 (such as ID information), each of the plurality of end units E can identify the BLE communication device 5 which has transmitted the advertisement signal thereto.

Each of the plurality of end units E which has received the advertisement signal calculates the strength of the advertisement signal (the RSSI data) received from the BLE communication device 5. At this time, each of the plurality of end units E obtains the sensing data about the customer (such as image data of the customer) using the sensor 45. After that, each of the plurality of end units E creates first report data from the RSSI data and the sensing data obtained by itself. The first report data contains information for identifying the BLE communication device 5, a time when the RSSI data and the sensing data obtained (a data obtainment time), a place of installation of the end unit E derived from the role setting 481 (a data obtainment place), a separation distance of the customer from the end unit E derived from the RSSI data, and a movement (such as posture) of the customer derived from the sensing data. After that, each of the plurality of end units E transmits the first report data to the master end unit ME connected to itself through the pairing connection.

Each of the plurality of master end units ME processes the first report data obtained from the plurality of end units E connected to itself through the pairing connections using the behavior determination module 493 to generate second report data. The second report data is data of the behavior of the customer in front of each shelf platform 61. In particular, the second report data contains the information for identifying the BLE communication device 5, the data obtainment time, the data obtainment place, a direction of movement and a speed of movement of the customer in front of each shelf platform 61 of the shelving unit 6, and the movement (such as the posture) of the customer. Each of the plurality of master end units ME transmits the generated second report data to the reporter unit R connected to itself through the pairing connection.

Each of the plurality of reporter units R processes the second report data obtained from the plurality of master end units ME connected to itself through the pairing connections using the behavior determination module 493 to generate third report data. The third report data is data of the behavior of the customer in front of each shelving unit 6. In particular, the third report data contains the information for identifying the BLE communication device 5, the data obtainment time, the data obtainment place, a direction of movement and a speed of movement of the customer in front of each shelving unit 6, and a movement of the customer (such a meandering movement, standstill and a change of the posture). Each of the plurality of reporter units R transmits the generated third report data to the master reporter unit MR connected to itself through the pairing connection.

Each of the plurality of master reporter units MR processes the third report data obtained from the plurality of reporter units R connected to itself through the pairing connections using the behavior determination module 493 to generate fourth report data. The fourth report data is data of the behavior of the customer in a peripheral area of each group of shelving units 7. In particular, the fourth report data contains the information for identifying the BLE communication device 5, the data obtainment time, the data obtainment place, a direction of movement and a speed of movement of the customer in the peripheral area of the group of shelving units 7, and the movement of the customer (such the meandering movement, the standstill and the change of the posture). Each of the plurality of master reporter units MR transmits the generated fourth report data to the application device 3 connected to itself through the pairing connection.

The application device 3 determines the behavior of the customer inside the store by processing the fourth report data obtained from the plurality of master reporter units MR connected to itself through the pairing connections. The behavior of the customer inside the store determined by the application device 3 is transmitted to the database 2 to be compiled the database as data of a trend in behavior of the customer inside the store. For example, it is possible to construct a database of the flow line of the customer inside the store and a database of an access frequency of the customer relating to each product from the data about the behavior of the customer inside the store determined by the application device 3. Thus, the database as described above can be utilized for deciding a layout inside the store and a Product lineup.

Since the RSSI data and the sensing data obtained by each end unit E are transmitted to the electronic shelf label devices 4 belonging to the higher hierarchies one after another, the electronic shelf label system 1 can provide not only an electronic shelf label function but also the above-described function of behavior determination of the customer and many different functions which use the sensing data. For example, if the sensor 45 contains the touch sensor (which is a touch panel provided together with the display 44 or a touch button provided separately from the display 44), the electronic shelf label system 1 can provide many different functions such as a function of calling the staff and a function of allowing the display 44 to display more detailed information on the product according to a touch operation from the customer with respect to the electronic shelf label device 4. For example, the function of behavior determination of the customer and the many different functions which use the sensing data can be utilized for increasing the efficiency of work of the store.

Further, the electronic shelf label device 4 belonging to each hierarchy processes the data obtained by itself or the data received from the other electronic shelf label device 4 belonging to the lower hierarchy to generate the report data in the cluster-type network CN as described above. Thus, the cluster-type network CN in the electronic shelf label system 1 of the present invention is implemented as a distributed network computing environment. Therefore, it is possible to considerably reduce a data processing amount of the application device 3 and a communication traffic amount among each of the electronic shelf label devices 4 compared to a case where data is merely transmitted from the electronic shelf label devices 4 belonging to the lower hierarchy to the other electronic shelf label device 4 belonging to the higher hierarchy and the data is finally processed by the application device 3. Further, it is possible to considerably reduce a data amount updated to the database 2 by the processes executed by the application device 3 and each electronic shelf label device 4.

Further, since imbalance in the processing load of each electronic shelf label device 4 does not occur due to the distributed network computing environment, it is possible to control an increase of a required arithmetic processing capability (the specification of the CPU) of the application device 3 and each electronic shelf label device 4. With this configuration, it is possible to construct the electronic shelf label system 1 with a low-spec application device 3 and low-spec electronic shelf label devices 4, and thereby the cost of introducing the electronic shelf label system can be significantly reduced.

Referring back to FIG. 1, the BLE communication device 5 is attached to the shopping basket and/or the shopping cart used by the customer inside the store. The BLE communication device 5 is any type of communication device which can execute the wireless communication according to the BLE standard with each of the plurality of electronic shelf label devices 4. The BLE communication device 5 transmits the advertisement signal to each of the plurality of electronic shelf label devices 4 at any frequency (For example, once a minute, once every 30 seconds). As a result, each of the plurality of electronic shelf label devices 4 can obtain the strength of the advertisement signal (the RSSI data) received from the BLE communication device 5 to utilize it for determining the behavior of the customer as described above.

Although the electronic shelf label system 1 of the present invention has been described above based on the illustrated embodiments, the present invention is not limited thereto. Each configuration of the present invention can be replaced with any configuration capable of performing the same function or any configuration can be added to each configuration of the present invention.

A person skilled in the art in the field and art to which this invention belongs will be able to make modifications to the configuration of the described communication system of the present invention without significantly departing from the principles, concepts, and scope of this invention, and communication systems having modified configurations are also involved within the scope of this invention.

For example, the number and types of components of the electronic shelf label system of the communication system shown in FIGS. 1 to 3 are merely illustrative examples and the present invention is not necessarily limited thereto. Aspects in which any component is added or combined or any component is deleted are also within the scope of the present invention without departing from the principles and intent of the present invention. Each component of the electronic shelf label system may be realized by hardware, software or a combination thereof.

Further, although all of the electronic shelf label device 4 constituting the cluster-type network CN include the sensor 45 in the above description, the present invention is not limited thereto. Aspects in which only each of the electronic shelf label devices 4 functioning as the end units E in the cluster-type network CN includes the sensor 45, and each of the electronic shelf label devices 4 functioning as the master reporter unit MR, the reporter unit R, or the master end unit ME in the cluster-type network CN does not include the sensor 45 are also within the scope of the present invention. In this case, the electronic shelf label devices 4 functioning as the end units E obtain the sensing data, and the electronic shelf label devices 4 functioning as the master reporter unit MR, the reporter unit R, or the master end unit ME processes the data transmitted from the electronic shelf label device 4 belonging to the lower hierarchy. It is also possible to provide the function of behavior determination of the customer and many different functions utilizing the sensing data by the above-described configuration.

Further, although the above description assumes that the behavior of the customer is determined using the sensing data obtained by the sensor 45 of each electronic shelf label device 4, the present invention is not limited thereto. Aspects in which a variety of matters except for the behavior of the customer are determined using the sensing data obtained by the sensor 45 of each electronic shelf label device 4 are also within the scope of the present invention.

The invention claimed is:

1. An electronic shelf label system, comprising:
    a cluster-type network constructed from a plurality of electronic shelf label devices each of which includes a display which can display information on a plurality of products placed on a plurality of shelving units; and
    an application device communicatively connected to the cluster-type network,
    wherein the cluster-type network contains:
        a shelf label hierarchy constructed from a plurality of electronic shelf label devices each of which functions as a shelf label for the plurality of products among the plurality of electronic shelf label devices, and
        a relay hierarchy constructed from a plurality of electronic shelf label devices each of which relays a signal transmitted from the application device to one of the plurality of electronic shelf label devices of the shelf label hierarchy among the plurality of electronic shelf label devices,
    wherein each of the plurality of shelving units includes a plurality of shelf platforms for placing the plurality of products thereon,
    wherein the relay hierarchy of the cluster-type network contains:
        a first hierarchy constructed from an electronic shelf label device related to a group of shelving units constituted of the plurality of shelving units arranged side by side among the plurality of electronic shelf label devices;
        a second hierarchy constructed from a plurality of electronic shelf label devices which are respectively related to the plurality of shelving units among the plurality of electronic shelf label devices, wherein each of the plurality of electronic shelf label devices of the second hierarchy is connected to the electronic shelf label device of the first hierarchy related to the group of shelving units to which the shelving unit related to the electronic shelf label device of the second hierarchy belongs through a pairing connection; and
        a third hierarchy constructed from a plurality of electronic shelf label devices which are respectively related to the plurality of shelf platforms of each of the plurality of shelving units among the plurality of electronic shelf label devices, wherein each of the plurality of electronic shelf label devices of the third hierarchy is connected to the electronic shelf label device of the second hierarchy which is related to the shelving unit to which the shelf platform related to the electronic shelf label device of the third hierarchy belongs through a pairing connection,
    wherein the shelf label hierarchy contains a product hierarchy which is related to each of the plurality of products placed on the plurality of shelving units among the plurality of electronic shelf label devices,
    wherein the product hierarchy is constructed from the plurality of electronic shelf label devices which function as the shelf labels for the plurality of products,
    wherein each of the plurality of electronic shelf label devices of the product hierarchy is connected to the electronic shelf label device of the third hierarchy of the relay hierarchy through a pairing connection, and
    wherein the electronic shelf label device of the third hierarchy of the relay hierarchy is related to the shelf platform on which the product related to the electronic shelf label device of the product hierarchy is placed.

2. The electronic shelf label system as claimed in claim 1, wherein each of the plurality of electronic shelf label devices is configured to enable:
    to receive a signal from a communication device which is provided at a shopping basket or a shopping cart used by a customer inside a store where the plurality of shelving units are installed, and
    to transmit a strength of the signal received from the communication device via the cluster-type network.

3. The electronic shelf label system as claimed in claim 2, wherein the application device is configured to determine behavior of the customer based on the strength of the signal which is received from the communication device by the electronic shelf label device.

4. The electronic shelf label system as claimed in claim 3, wherein the plurality of electronic shelf label devices of the shelf label hierarchy transmit data which is obtained by processing the strength of the signal received from the communication device to the plurality of electronic shelf label devices of the relay hierarchy,
    wherein the plurality of electronic shelf label devices of the relay hierarchy transmit data which is obtained by processing the data received from each of the plurality of electronic shelf label devices of the shelf label hierarchy to the application device, and
    wherein the application device is configured to determine the behavior of the customer based on the data which is received from the plurality of electronic shelf label devices of the relay hierarchy.

5. The electronic shelf label system as claimed in claim 1, wherein each of the plurality of electronic shelf label devices further includes a sensor, and wherein each of the plurality of electronic shelf label devices is configured to enable to transmit sensing data of the sensor via the cluster-type network.

6. The electronic shelf label system as claimed in claim 1, wherein each of the plurality of electronic shelf label devices further includes a light emitting unit, and
   each of the plurality of electronic shelf label devices is configured to drive the light emitting unit according to a command transmitted from the application device via the cluster-type network.

7. The electronic shelf label system as claimed in claim 1, wherein the pairing connection conforms to a BLE (Bluetooth Low Energy) standard.

8. An electronic shelf label system, comprising:
   a cluster-type network constructed from a plurality of electronic shelf label devices each of which includes a display which can display information on a plurality of products placed on a plurality of shelving units; and
   an application device communicatively connected to the cluster-type network,
   wherein the cluster-type network contains:
      a shelf label hierarchy constructed from a plurality of electronic shelf label devices each of which functions as a shelf label for the plurality of products among the plurality of electronic shelf label devices, and
      a relay hierarchy constructed from a plurality of electronic shelf label devices each of which relays a signal transmitted from the application device to one of the plurality of electronic shelf label devices of the shelf label hierarchy among the plurality of electronic shelf label devices,
   wherein each of the plurality of electronic shelf label devices is configured to enable:
      to receive a signal from a communication device which is provided at a shopping basket or a shopping cart used by a customer inside a store where the plurality of shelving units are installed, and
      to transmit a strength of the signal received from the communication device via the cluster-type network.

* * * * *